US012759157B2

(12) United States Patent
Kitano et al.

(10) Patent No.: US 12,759,157 B2
(45) Date of Patent: Oct. 13, 2026

(54) SUBSTRATE TRANSFER APPARATUS AND METHOD OF CALIBRATING SUBSTRATE TRANSFER APPARATUS

(71) Applicants: KAWASAKI JUKOGYO KABUSHIKI KAISHA, Kobe (JP); Kawasaki Robotics (USA), INC., Wixom, MI (US)

(72) Inventors: Shinya Kitano, Kobe (JP); Weston Wahl, San Jose, CA (US); Ming Zeng, San Jose, CA (US); Simon Jeyapalan, Newark, CA (US); Iori Kurata, San Jose, CA (US)

(73) Assignees: KAWASAKI JUKOGYO KABUSHIKI KAISHA, Kobe (JP); Kawasaki Robotics (USA), INC., Wixom, MI (US)

( * ) Notice: Subject to any disclaimer, the term of this patent is extended or adjusted under 35 U.S.C. 154(b) by 432 days.

(21) Appl. No.: 18/396,786

(22) Filed: Dec. 27, 2023

(65) Prior Publication Data

US 2025/0214245 A1 Jul. 3, 2025

(51) Int. Cl.
*B25J 9/16* (2006.01)
*B25J 9/04* (2006.01)
*B25J 11/00* (2006.01)

(52) U.S. Cl.
CPC ............. *B25J 9/1692* (2013.01); *B25J 9/042* (2013.01); *B25J 9/1653* (2013.01); *B25J 9/1661* (2013.01); *B25J 11/0095* (2013.01)

(58) Field of Classification Search
CPC ........ B25J 9/1692; B25J 9/042; B25J 9/1653; B25J 9/1661; B25J 11/0095
See application file for complete search history.

(56) References Cited

U.S. PATENT DOCUMENTS 11,273,554 B2 * 3/2022 Doan ..................... B25J 9/1692
2005/0267620 A1 * 12/2005 Krupyshev ......... H10P 72/0608 700/114
2011/0160897 A1 * 6/2011 Shimomura ........ H10P 72/7602 700/217
2015/0025683 A1 * 1/2015 Amano .................. B25J 9/1692 700/254
2018/0345493 A1 * 12/2018 Kokubo ................. B25J 9/1697
2021/0305076 A1 9/2021 Yin et al.
(Continued)

FOREIGN PATENT DOCUMENTS

JP H3-55179 A 3/1991
JP H6-224284 A 8/1994
JP H6-326172 A 11/1994
(Continued)

OTHER PUBLICATIONS

English Translation of KR102598788B1 with numbered paragraphs.*

*Primary Examiner* — Patrick H Mackey
(74) *Attorney, Agent, or Firm* — METROLEX IP LAW GROUP, PLLC; Robert L. Scott, Esq.

(57) ABSTRACT

A method of calibrating a substrate transfer apparatus according to one or more embodiments may include: fixing a substrate transfer apparatus; measuring the operation of the fixed substrate transfer apparatus; generating eigendata relating to an operation of the fixed substrate transfer apparatus; and storing the eigendata in the substrate transfer apparatus.

15 Claims, 8 Drawing Sheets

(56) References Cited

U.S. PATENT DOCUMENTS

| | | | | | |
|---|---|---|---|---|---|
| 2023/0163009 | A1 * | 5/2023 | Kim | .................... | H10P 72/3302 |
| | | | | | 414/751.1 |

FOREIGN PATENT DOCUMENTS

| | | | | | |
|---|---|---|---|---|---|
| JP | 2001-287178 | A | | 10/2001 | |
| JP | 2009-166163 | A | | 7/2009 | |
| JP | 2015-74039 | A | | 4/2015 | |
| KR | 102342264 | B1 | * | 12/2021 | ............. G09B 25/02 |
| KR | 102598788 | B1 | * | 11/2023 | ........... H01L 21/681 |
| TW | I808046 | B | | 7/2023 | |

* cited by examiner

SUBSTRATE TRANSFER APPARATUS AND METHOD OF CALIBRATING SUBSTRATE TRANSFER APPARATUS

BACKGROUND

The disclosure relates to a substrate transfer apparatus and a method of calibrating a substrate transfer apparatus.

A wide variety of manufacturing apparatuses are used when manufacturing a semiconductor substrate, a liquid crystal substrate, a panel, or the like (hereinafter, these may be collectively referred to simply as a substrate). A transfer apparatus is used to transport substrates between these manufacturing apparatuses. The transfer apparatus include industrial robots.

Japanese laid-open patent publication 2001-287178 (Sagues) (Related case U.S. Pat. No. 6,075,334) discloses an automatic calibration device, wherein a controller 24 of the automatic calibration device has a memory and a logic circuit and is connected to a robot 22. The robot has an articulated arm 36 movable in vertical (Z), horizontal (θ) and radial (R) directions and a wafer holding plate 42 at the end of the arm. The dimensional characteristics of the enclosure forming the process station 32 and the wafer holding plate are stored in the memory of the controller. Each enclosure and the wafer holding plate of the robot are provided with sensors 44, 48, 68 which send signals to the controller regarding the position of the wafer holding plate. The controller is programmed to perform a series of sequential movements of the robot in the enclosure of the process station, controlled by a combination of the signals of the sensors and the dimensional characteristic values.

SUMMARY

A method of calibrating a substrate transfer apparatus according to one or more embodiments may include fixing a substrate transfer apparatus; measuring the operation of the fixed substrate transfer apparatus; generating eigendata relating to an operation of the fixed substrate transfer apparatus; and storing the in the substrate transfer apparatus.

The substrate transfer apparatus according to one or more embodiments may include a base; elevator connected to the base and extending and retracting; an end effector including a target that reflects light and a memory, the end effector is lifted and lowered with extension and retraction of the elevator, wherein the memory stores eigendata related to fixing of the substrate transfer apparatus at the time of test and eigendata related to an operation of the fixed substrate transfer apparatus.

DETAILED DESCRIPTION

Figure 1:
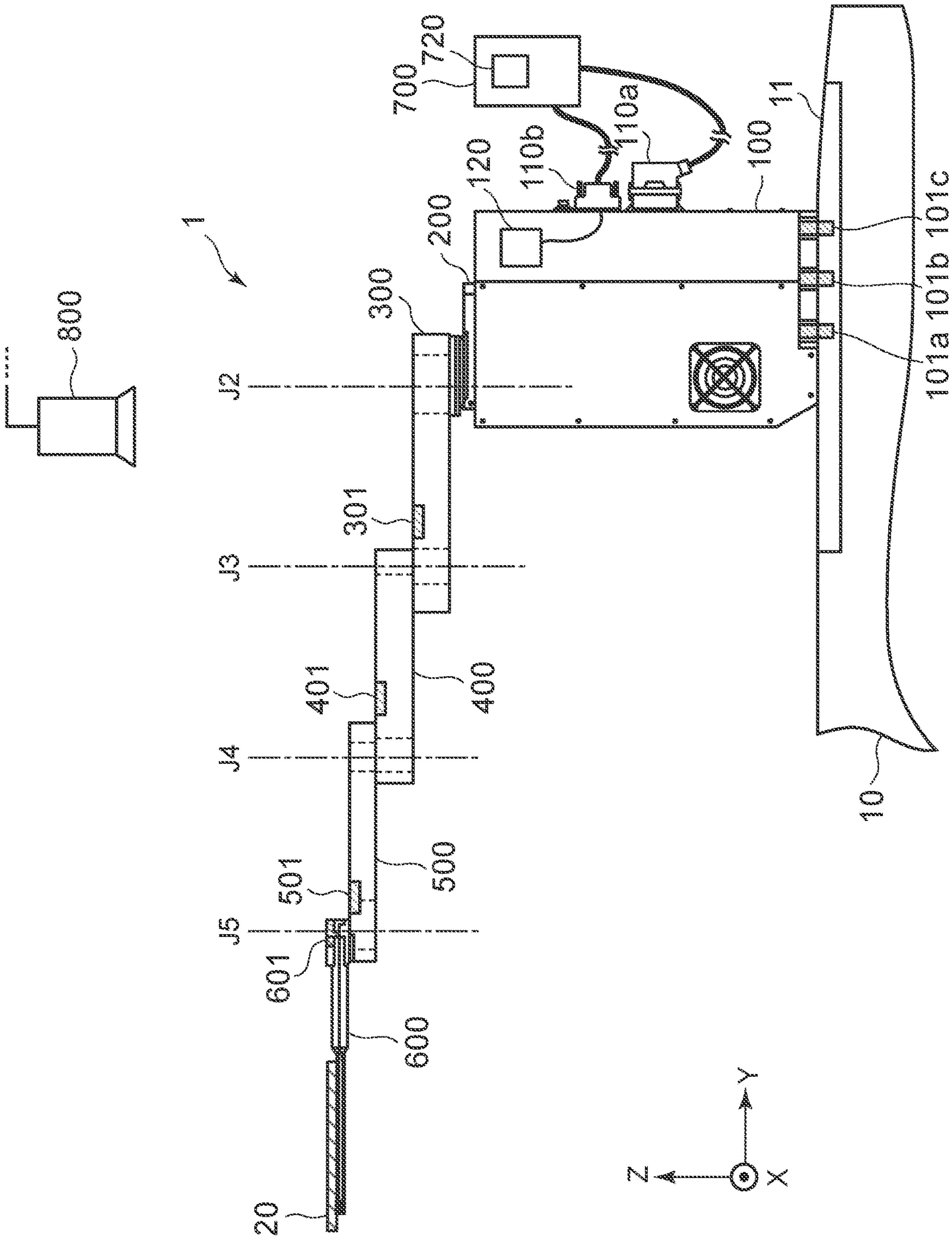
FIG. 1 is a diagram illustrating a side view of a substrate transfer apparatus 1 according to one or more embodiments.

A substrate transfer apparatus and a method of calibrating a substrate transfer apparatus according to one or more embodiments will be described in detail with reference to the drawings. In the description of the drawings, the same or similar parts may be denoted by the same or similar reference numerals. The drawings are schematically illustrated, and the relationship between the thickness and the dimension and the ratio of the length, the thickness, and the like of each part are examples and do not limit the scope of the technical idea. Dimensional relationships and dimensional ratios may differ between drawings. In the following description, when describing a positional relationship between components, "upper", "lower", "right side", "left side", and the like are appropriately used based on a direction of a drawing to be referred to or a specific target, but these indications do not limit the scope of the technical idea. Expressions such as "upper," "lower", "right", and "left" may be used even when each part is not touched. The "length direction" may mean a direction of a long side of a main surface of a member. The "width direction" may mean a direction of a short side of a main surface of a member. A "height direction" or a "vertical direction" may mean a direction related to a thickness of a main surface of a member. In addition, an X-axis, a Y-axis, a Z-axis, or a combination thereof may be indicated in the drawings, and an "X-axis direction", a "Y-axis direction", and a "Z-axis direction" may be used in the specification or the drawings to describe directions.

FIG. 1 is a side view of a substrate transfer apparatus 1 according to one or more embodiments. The substrate transfer apparatus 1 includes a base 100, an elevator 200 connected to the base 100 so as to be extendable and retractable in the vertical direction (Z-axis direction), the link 300 connected to the elevator 200 so as to be rotatable, the link 400 connected to the link 300 so as to be rotatable, the link 500 connected to the link 400 so as to be rotatable, and an end effector 600 connected to the link 500 so as to be rotatable and transport the substrate 20. The substrate transfer apparatus 1 of FIG. 1 particularly shows a horizontal articulated substrate transfer apparatus, but may be implemented without being limited thereto. The substrate transfer apparatus 1 of FIG. 1 includes three links 300, 400, and 500, but is not limited thereto, and may include one, two, four, five, or the like. Further, the substrate transfer apparatus 1 may not include a link, and the end effector 600 may be directly connected to the elevator 200. Further, the substrate transfer apparatus 1 may not include the elevator 200, and one or a plurality of links may be directly connected to the base 100. Various operations of the substrate transfer apparatus 1 are controlled by the controller 700. The controller 700 controls various operations of the elevator 200, the link

300, the link 400, the link 500, and the end effector 600, including lifting and lowering operations and rotating operations.

The base 100 is fixed to the floor surface 10 or a gantry table (not shown) by pins 101*a*, 101*b*, 101*c*, and the like. In one or more embodiments, the base 100 is fixed using an attachment plate 11 embedded in the floor surface 10. However, the base 100 is not limited thereto, and may be directly fixed to the floor surface 10 or fixed to the gantry table. The base 100 may be fixed to a movable traveling device. The movable traveling device is a device that loads the substrate transfer apparatus and moves the substrate transfer apparatus. The base of the substrate transfer apparatus is fixed to the traveling device. The movement of the traveling device includes horizontal movement and vertical movement. The base 100 may be fixed to a wall. Further, the base 100 may be fixed so as to be suspended from the ceiling. For convenience of description, the meaning of fixing the base 100 may be used in a broad sense including "fixing the base 100 using the attachment plate 11 embedded in the floor surface 10", "directly fixing the base 100 to the floor surface 10", "fixing the base 100 to the stand table", "fixing the base 100 to the traveling device", "fixing the base 100 to the wall", and "fixing the base 100 by suspending from the ceiling". The conditions when the substrate transfer apparatus 1 is installed on the floor surface 10, for example, the positions of the pins 101*a*, 101*b*, and 101*c*, the state of the floor surface 10, and the like may be stored as eigendata.

The elevator 200 includes a first end that is connected to the base 100, and a second end that is connected to the link 300. As shown in FIG. 1, the link 300 is stored in the base 100, and extends and retracts according to an instruction from the controller 700. The link 300 is lifted and lowered by the extension and retraction. The elevator 200 may be fixed to the base 100.

The link 300 includes a first end connected to the elevator 200 and a second end connected to the link 400. The link 300 rotates about the rotation axis J2 with respect to the elevator 200 in accordance with an instruction from the controller 700. The link 400 has a first end connected to the link 300 and a second end connected to the link 500. The link 400 rotates around the rotation axis J3 with respect to the link 300 in accordance with an instruction from the controller 700. The link 500 has a first end connected to the link 400 and a second end connected to the end effector 600. The link 500 rotates around the rotation axis J4 with respect to the link 400 in accordance with an instruction from the controller 700. The link 500 is connected to a first end of the end effector 600, and the end effector 600 grips the substrate 20 and moves the substrate 20 to a predetermined place. The end effector 600 rotates around the rotation axis J5 with respect to the link 500 in accordance with an instruction from the controller 700.

As shown in FIG. 1, the link 300 of the substrate transfer apparatus 1 according to one or more embodiments includes the target 301, the link 400 includes the target 401, the link 500 includes the target 501, and the end effector 600 includes the target 601. However, one or more embodiments is not limited thereto, and the substrate transfer apparatus 1 may have at least one target. In this case, the substrate transfer apparatus 1 may have the target 601 in the end effector 600 installed at the highest position in the Z-axis. The target 301, the target 401, the target 501, and the target 601 may include a reflector that reflects the laser emitted by the laser tracker 800. It may be preferrable that the target 301, the target 401, the target 501, and the target 601 are installed at positions that do not interfere with the operation of the substrate transfer apparatus 1. For example, it may be preferrable the target 301 provided on the link 300 is embedded in the link 300. This is to prevent interference with the target 301 during operation of the link 400 or the like. Similarly, it may be preferrable that the target 401 and the target 501 are embedded in the link 400 and the link 500, respectively. It may be preferrable the target 601 is installed so as not to interfere with other devices when the end effector 600 moves. In this regard, it may be preferrable that the target 601 is embedded in the end effector 600. Further, for example, it may be preferrable that the installation position of the target 301 is as far as possible from the rotation axis J2 of the link 300. This configuration is for obtaining more accurate eigendata. Similarly, it may be preferrable that the installation position of the target 401 is as far as possible from the link rotation axis J3, and the installation position of the target 501 is as far as possible from the link rotation axis J4.

The laser tracker 800 installed outside the substrate transfer apparatus 1 irradiates light. The laser tracker 800 is placed at a position for reading a position of a target provided in the substrate transfer apparatus 1. The laser tracker 800 may be arranged above the substrate transfer apparatus 1 at a position that does not interfere during operation of the substrate transfer apparatus 1. The laser tracker 800 is not included in the components of the substrate transfer apparatus 1, but may include the components.

When receiving light from the laser tracker 800, the targets 301, 401, 501, and 601 reflect the light. The laser tracker 800 receives the reflected light and measures the three-dimensional positions of the targets 301, 401, 501, and 601 based on the reflected light. The measured three-dimensional positions are converted into data as three-dimensional position coordinates of the targets 301, 401, 501, and 601. Thereafter, based on the three-dimensional position coordinates of the targets 301, 401, 501, and 601 converted into data, a movement distance, a movement angle, a geometric tolerance, and the like are calculated. These calculations may be performed by a computer (not shown) or by the controller 700. The substrate transfer apparatus 1 may store the calculated as eigendata in the memory 120 of the substrate transfer apparatus 1. The eigendata is read as necessary when the substrate transfer apparatus 1 is installed, for example. The eigendata may be stored in the memory 720 of the controller 700 connected to the substrate transfer apparatus 1. The eigendata may be stored in a device (not shown) that centrally manages the substrate transfer apparatus in association with the substrate transfer apparatus 1.

The substrate transfer apparatus 1 in which the eigendata is acquired and stored is installed at, for example, a delivery destination. At the time of installation, the eigendata is read, and installation of the substrate transfer apparatus 1 and various corrections and adjustments are performed based on the eigendata.

Figure 2:
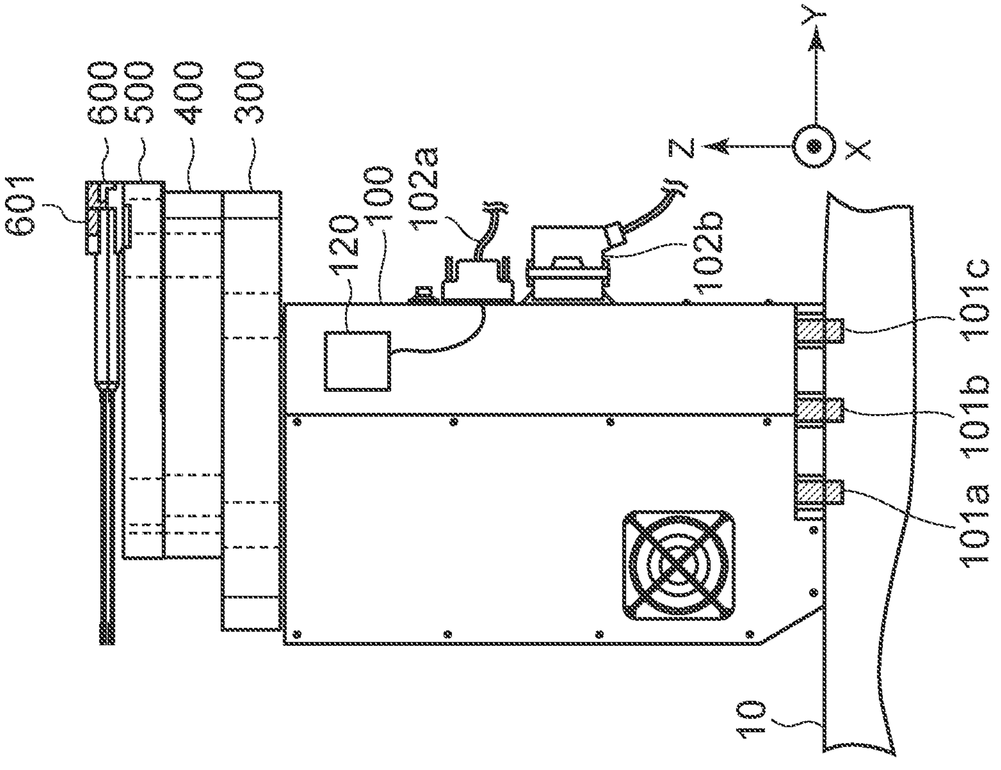
FIG. 2 is a diagram illustrating a storage state of a substrate transfer apparatus 1 according to one or more embodiments.

FIG. 2 is a diagram illustrating a storage state of the substrate transfer apparatus 1 according to one or more embodiments. As shown in FIG. 2, the substrate transfer apparatus 1 is in a state in which the link 300, the link 400, the link 500, and the end effector 600 are extended as shown in FIG. 1. From this state, by rotating the link 300, the link 400, the link 500, and the end effector 600, the link 300, the link 400, the link 500, and the end effector 600 overlap each other, and the substrate transfer apparatus 1 is in the stored state as shown in FIG. 2. In the substrate transfer apparatus 1 shown in FIG. 1, the base 100 is fixed using the attachment plate 11 embedded in the floor surface 10. In the substrate transfer apparatus 1 shown in FIG. 2, the base 100 is directly fixed to the floor surface 10 using pins 101*a*, 101*b*, and 101*c*.

Figure 3:
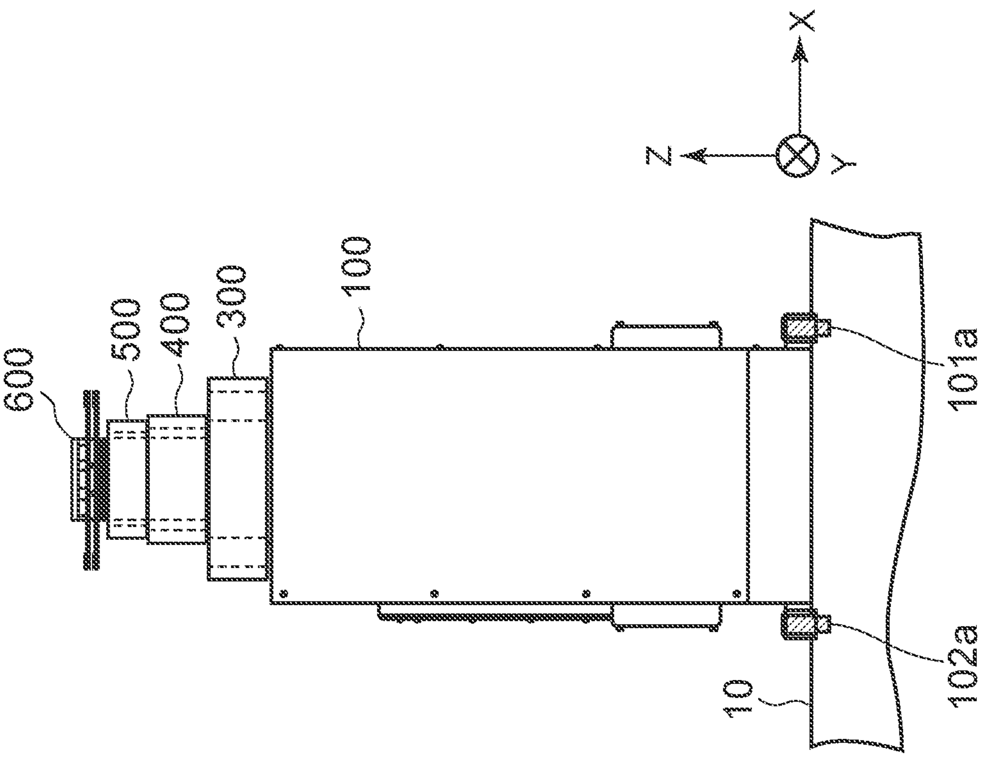
FIG. 3 is a diagram illustrating a front view of a substrate transfer apparatus 1 according to one or more embodiments.

FIG. 3 illustrates a front view of a substrate transfer apparatus 1 according to one or more embodiments. The substrate transfer apparatus 1 shown in FIG. 3 is in a retracted state. The substrate transfer apparatus 1 shown in FIG. 3 is an example in which one side surface is directly fixed to the floor surface 10 using the pin 101*a*, and the other side surface is directly fixed to the floor surface 10 using the pin 102*a*. The other side surface of the substrate transfer apparatus 1 may be directly fixed to the floor surface 10 using a plurality of pins.

Figure 4:
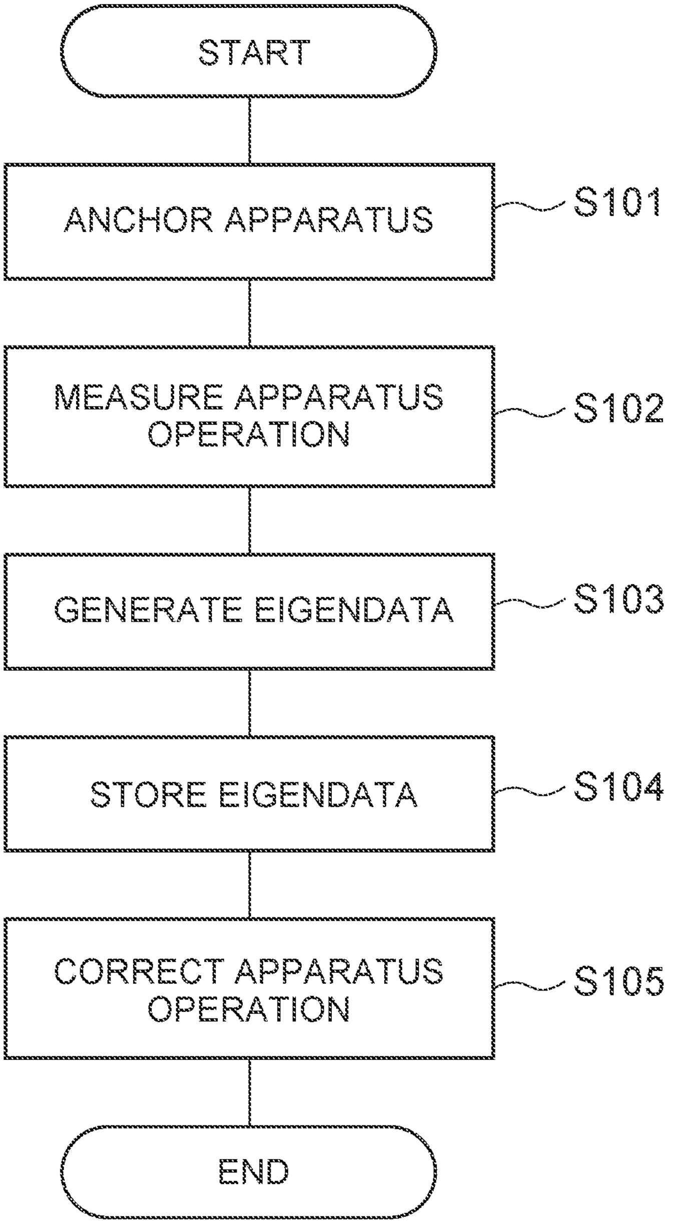
FIG. 4 is a block diagram illustrating a method of calibrating a substrate transfer apparatus according to one or more embodiments.

FIG. 4 is a block diagram illustrating a method of calibrating a substrate transfer apparatus according to one or more embodiments. For example, in the quality test before shipment of the substrate transfer apparatus, a test is performed to determine whether each part of the substrate transfer apparatus appropriately operates. During test of the substrate transfer apparatus, a calibration method of the substrate transfer apparatus described below may be performed.

First, at the time of quality test of the substrate transfer apparatus 1 or the like, the substrate transfer apparatus 1 is fixed in order to calibrate the substrate transfer apparatus 1 (step S101). For example, the base 100 of the substrate transfer apparatus 1 shown in FIG. 1 may be fixed to the floor surface 10. As a fixing method, for example, the pins 101*a*, 101*b*, and 101*c* may be passed through fixing holes (not shown) of the base 100. In order to fix the substrate transfer apparatus 1, it may be preferable to fix the substrate transfer apparatus 1 at two or more positions using pins. In the case where there are a plurality of fixing holes, it may be preferable that the fixing holes used at the time of fixing are fixing holes used at an installation place where actual installation is performed. In other words, it may be preferable to use the fixing hole used at the time of calibration also at the actual installation place in terms of accurate eigendata acquisition. The actual installation location includes, for example, a delivery destination of a customer. As the installation place, it may be preferable that the floor surface 10 or the gantry table has sufficient rigidity, and that the installation place is ensured flat so that an excessive force does not act on the fixing hole or the pin. For example, in the case of floor installation, the horizontal plane is preferably within ±5%. The position of the fixing hole used for fixing at the time of calibration is used to fix to the installation location, and the base coordinates of the XY plane of the substrate transfer apparatus 1 are set using a plurality of objects. Since the object is intended for the base coordinate of the XY plane, it may be preferable at least two objects are used. When the substrate transfer apparatus 1 is installed at the installation location using the attachment plate 11 of the substrate transfer apparatus 1, it may be preferable to prepare the same environment as the installation location. However, the environment may be any environment as long as base coordination of the XY plane of the substrate transfer apparatus 1 may be performed. The environmental condition of the base coordinate of the XY plane of the substrate transfer apparatus 1 at the time of quality test or the like may be stored as eigendata.

In the calibration method of the substrate transfer apparatus 1 according to one or more embodiments, the operation of the substrate transfer apparatus 1 is measured (step S102). The apparatus for measurement includes an optical measuring instrument. The optical measurement device is a device that measures a position or the like of an object by applying light or laser to the object and analyzing reflected light or the laser. In one or more embodiments, a laser tracker 800 may be used as the optical measurement instrument. The laser tracker 800 is a measuring apparatus that measures a two-dimensional or three-dimensional position of a target by irradiating the target used for measurement with laser light and measuring the laser light reflected from the target. The laser tracker 800 according to one or more embodiments may measure the three-dimensional position to obtain the three-dimensional position of the target. The three-dimensional position may be the three-dimensional position coordinates of the target. The targets 301, 401, 501, and 601 are provided in the link 300, the link 400, the link 500, and the end effector 600 of the substrate transfer apparatus 1, respectively. The elevator 200 performs lifting operation, and the link 300, the link 400, the link 500, and the end effector 600 perform rotating operation. The target is also moved in accordance with the elevating operation and the rotating operation. The target reflects the laser light emitted from the laser tracker 800, and the laser tracker 800 receives the reflected light. The three-dimensional position of the target is measured based on the received laser light.

In the method for calibrating the substrate transfer apparatus 1 according to one or more embodiments, eigendata is generated (step S103). The eigendata may include conditions when the substrate transfer apparatus 1 is installed on the floor surface 10, for example, the position of the pin, the state of the floor surface 10, and the base coordinates of the XY plane. The eigendata may include the three-dimensional position coordinates, the movement distance, the movement angle, and the geometric tolerance of the target measured in step S102. In addition, the eigendata may include a deviation between a theoretical value in design and a three-dimensional position coordinate which is an actual measurement value. Further, the eigendata may include a correction value calculated based on a deviation between a theoretical value in design and an actual measurement value. The deviation in the X-axis, Y-axis, and Z-axis coordinates may be calculated based on the movement vector direction of the elevator 200. Correction values during operation of the elevator 200, the link 300, the link 400, the link 500, and the end effector 600 are calculated based on the calculated deviations in the X-axis, Y-axis, and Z-axis coordinates. The eigendata may include a correction value calculated based on the deviation in the X-axis, Y-axis, and Z-axis coordinates described above. The above-described conditions and the like are calculated as necessary and generated as eigendata. The generated eigendata is stored in the memory.

In the method for calibrating the substrate transfer apparatus 1 according to one or more embodiments, the eigendata is stored (step S104). For example, the calculated eigendata may be stored in the memory 120 of the substrate transfer apparatus 1. The eigendata may be stored in the memory 720 of the controller 700 connected to the substrate transfer apparatus 1. The eigendata may be stored in a device (not shown) that centrally manages the substrate transfer apparatus in association with the substrate transfer apparatus 1. The centralized management device does not need to be installed near the substrate transfer apparatus 1. For example, the controller 700 may download the eigendata of the substrate transfer apparatus 1 from the centralized management device via the Internet. The eigendata is read as necessary when the substrate transfer apparatus 1 is installed, for example, and is used when calibration is performed.

Next, in the calibration method of the substrate transfer apparatus 1 according to one or more embodiments, operation correction of the substrate transfer apparatus 1 is performed (step S105). For example, at the time of installation at the delivery destination, the eigendata is read and various corrections and adjustments are made. After the installation, the controller 700 may control the operations of the elevator 200, the link 300, the link 400, the link 500, and the end effector 600 based on the eigendata. Specifically, the controller 700 may read a correction value calculated based on a deviation between a design theoretical value and an actual measurement value, and may perform operation control of the elevator 200, the link 300, the link 400, the link 500, and the end effector 600 based on the correction value.

Next, a specific example of a substrate transfer apparatus and a substrate transfer apparatus calibration method according to one or more embodiments will be described. First, the substrate transfer apparatus 1 to be calibrated is fixed to the floor surface 10, and conditions and the like related to the fixing are stored as eigendata. While the substrate transfer apparatus 1 is fixed to the floor surface 10, the elevator 200 is lifted and lowered, and the link 300, the link 400, the link 500, and the end effector 600 are rotated.

Figure 5:
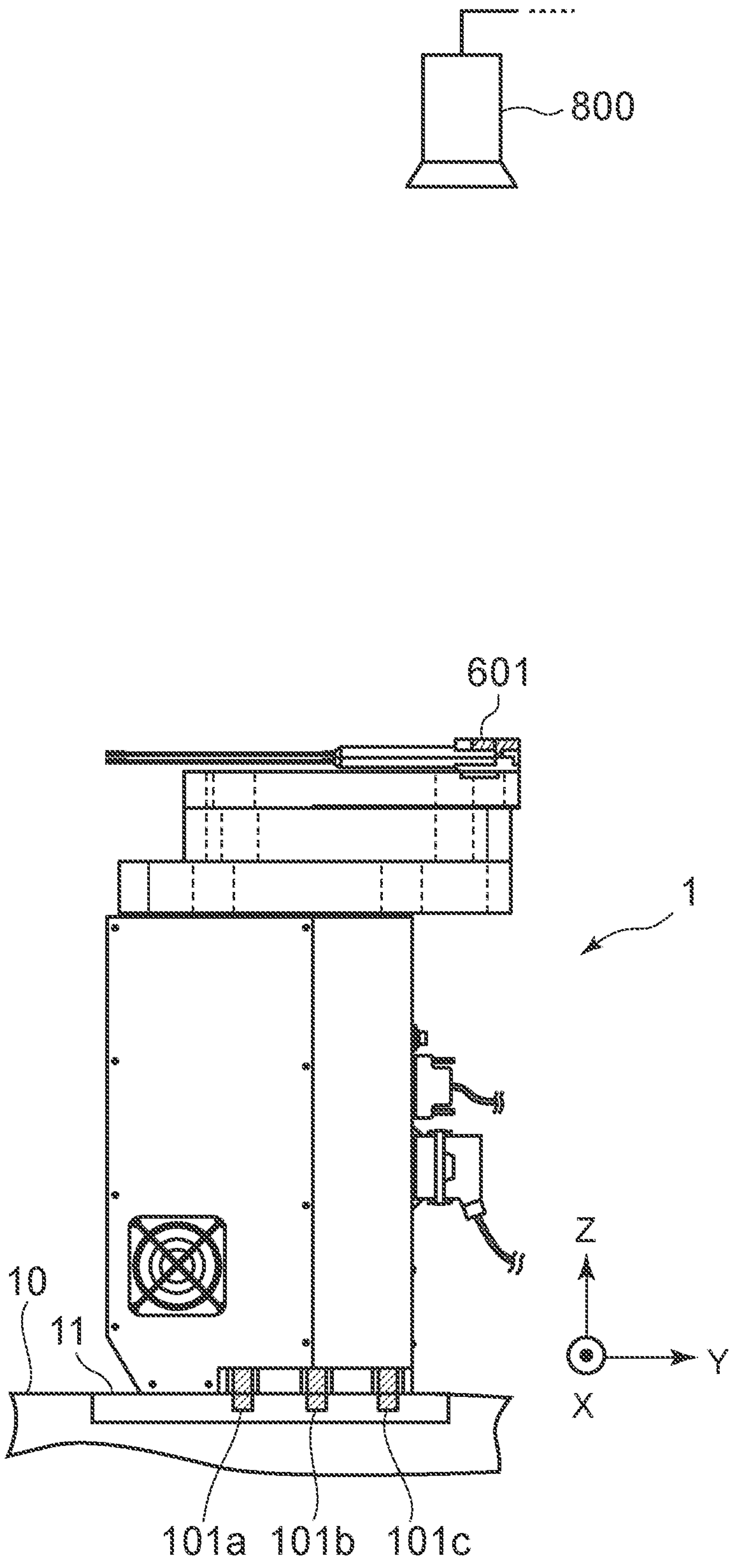
FIG. 5 is a diagram illustrating a stored state of a substrate transfer apparatus 1 according to one or more embodiments.

FIG. 5 is a diagram illustrating a storage state of the substrate transfer apparatus 1 according to one or more embodiments. The position of the target 601 in the substrate transfer apparatus 1 in the stored state is measured. The laser tracker 800 is used to measure the position. The laser tracker 800 irradiates the target 601 with laser light. The laser tracker 800 receives the laser light reflected from the target 601 to measure the three-dimensional position of the target 601. As shown in FIG. 5, the position of the target 601 in the stored state of the substrate transfer apparatus 1 is measured to obtain the three-dimensional position coordinates of the target 601. The obtained three-dimensional position coordinates are stored in a memory (not shown) as the eigendata.

Figure 6:
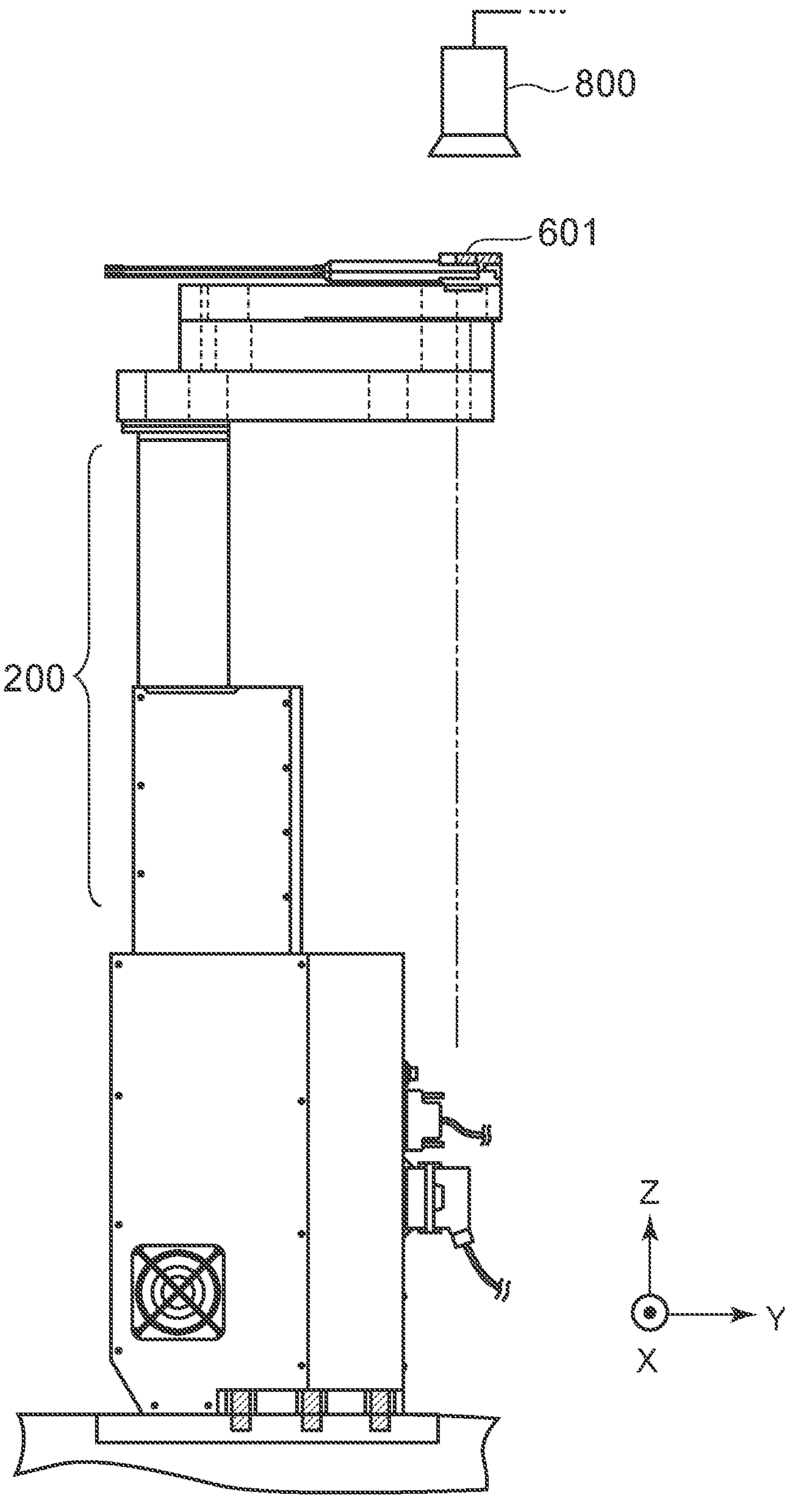
FIG. 6 is a diagram illustrating a state where an end effector 600 of a substrate transfer apparatus 1 according to one or more embodiments is lifted.

FIG. 6 is a diagram illustrating a state in which the end effector 600 of the substrate transfer apparatus 1 according to one or more embodiments is lifted. When the end effector 600 is lifted by extending the elevator 200, the target 601 is also lifted accordingly. The laser tracker 800 measures the position of the target 601 after being lifted, and obtains three-dimensional position coordinates of the target 601. The obtained three-dimensional position coordinates are stored in a memory (not shown). As a result, the three-dimensional position coordinates of the target 601 in the stored state of the substrate transfer apparatus 1 and the three-dimensional position coordinates of the target 601 after being lifted are obtained. The eigendata is generated based on the three-dimensional position coordinates of the target 601 in the stored state of the substrate transfer apparatus 1 and the three-dimensional position coordinates of the target 601 after being lifted. The eigendata includes the three-dimensional position coordinates of the target 601 in the stored state of the substrate transfer apparatus 1, the X-axis, Y-axis, and Z-axis coordinates of the three-dimensional position coordinates of the target 601 after being lifted, and a deviation caused by the operation. Further, deviations between the designed theoretical values and the X-axis, Y-axis, and Z-axis coordinates of the three-dimensional position coordinates, which are actually measured values, may be calculated. These deviations are calculated and generated as eigendata, and the eigendata is stored in the memory. The deviation in the X-axis, Y-axis, and Z-axis coordinates may be calculated based on the movement vector direction of the elevator 200. Further, a correction value during operation of the elevator 200 may be calculated based on the calculated deviations in the X-axis, Y-axis, and Z-axis coordinates. The eigendata may include a correction value calculated based on the deviation in the X-axis, Y-axis, and Z-axis coordinates described above.

Figure 7:
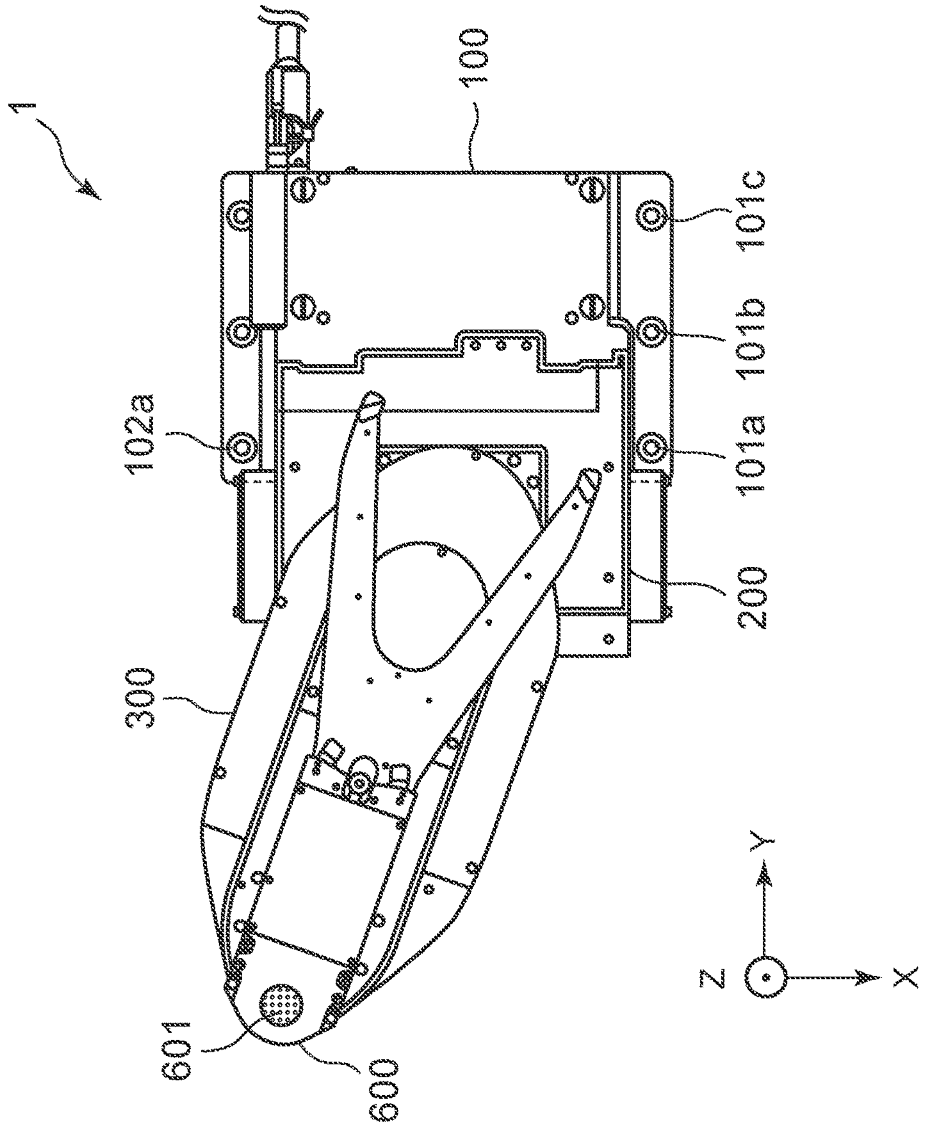
FIG. 7 is a diagram illustrating a top view of a substrate transfer apparatus 1 according to one or more embodiments.

FIG. 7 is a diagram illustrating a top view of a substrate transfer apparatus 1 according to one or more embodiments. For convenience of description, the substrate transfer apparatus 1 illustrated in FIG. 7 illustrates a state after the link 300 rotates by a certain angle from the stored state.

Figure 8:
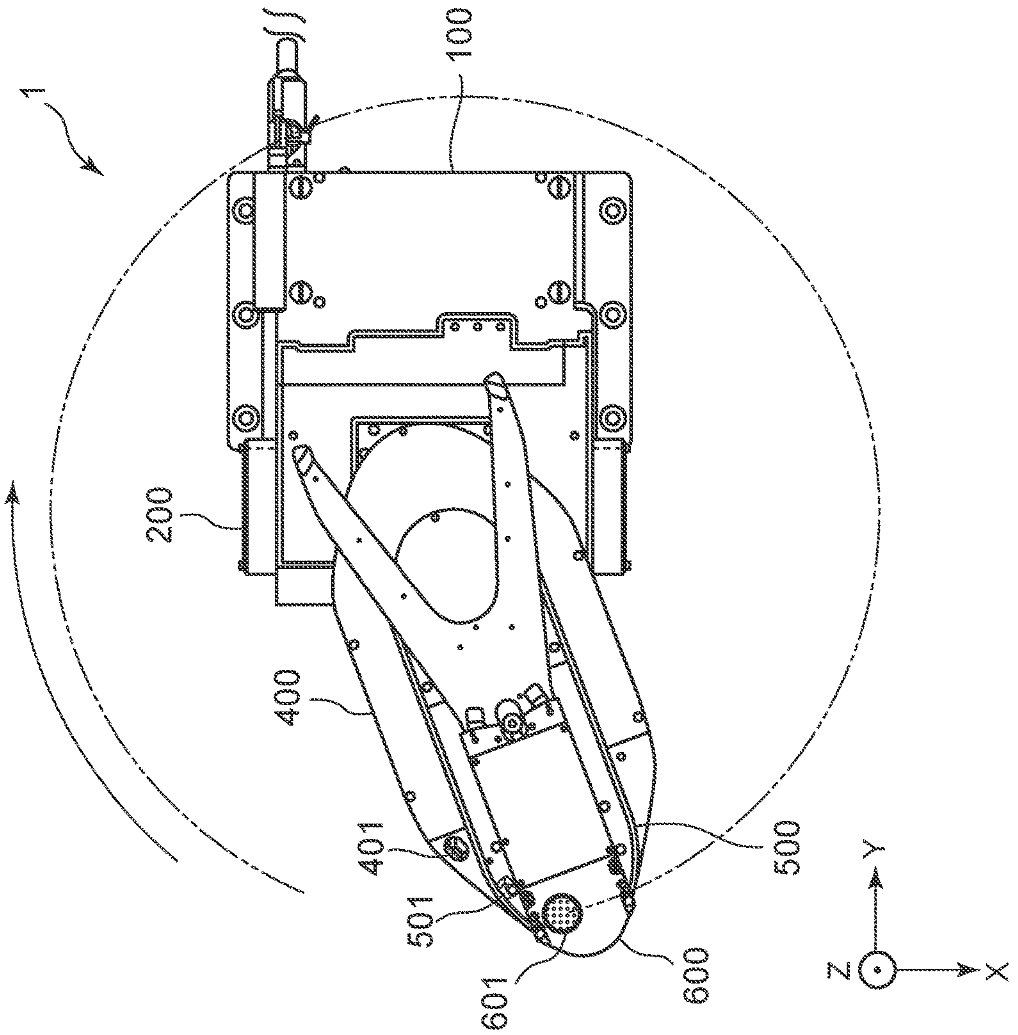
FIG. 8 is a diagram illustrating a top view of a state in which a link 300 of a substrate transfer apparatus 1 according to one or more embodiments is rotating.

FIG. 8 is a diagram illustrating a top view of a state in which the link 300 of the substrate transfer apparatus 1 according to one or more embodiments is rotating. As the link 300 rotates from the elevator 200 about the rotation axis J2, the target 601 on the end effector 600 rotates. The target 601 rotates substantially in the illustrated XY plane. The laser tracker 800 emits laser light, and the target 601 reflects the laser light. The laser light reflected from the target 601 is received by the laser tracker 800, and the three-dimensional position of the target 601 is measured. The three-dimensional position coordinates of the target 601 are obtained based on the three-dimensional position of the target 601. The obtained three-dimensional position coordinates are stored in a memory (not shown). The eigendata is generated based on the three-dimensional position coordinates of the target 601 in the rotation state of the link 300 of the substrate transfer apparatus 1. The eigendata includes the X-axis, Y-axis, and Z-axis coordinates of the three-dimensional position coordinates at the time of rotation of the target 601 in the stored state of the substrate transfer apparatus 1 and a deviation caused by this operation. In addition, deviations between the designed theoretical values and the X-axis, Y-axis, and Z-axis coordinates of the three-dimensional position coordinates, which are actually measured values, are included. These deviations are calculated, generated as eigendata, and stored in the memory. The correction value during the operation of the link 300 may be calculated based on the calculated deviation in the X-axis, Y-axis, and Z-axis coordinates. The eigendata may include a correction value calculated based on a deviation in X-axis, Y-axis, and Z-axis coordinates in rotation.

When link 300 is rotating, elevator 200, link 400, link 500, and the end effector 600 may be stationary. Further, the center of the rotation circle may be calculated as a point at which a normal vector of the best-fit circle intersects a plane of the end effector 600, for example, a plane of a substrate (not shown) in the case of the substrate transfer apparatus 1. The rotation axis may be calculated as the unit normal vector of the best-fit circle. The length of each of the link 300, the link 400, and the link 500 may be calculated as a distance between points at which the rotation axis related to the connection portion between the link and the next upper link intersects the plane related to the end effector 600. If the substrate transfer apparatus 1 also has a linear degree of freedom, the optimal line direction for the collected data may be calculated. The kinematic model of the substrate transfer apparatus 1 may be calculated based on the length and the rotation axis direction of each link subjected to detect. The position of link zero may be detected by calculating the direction of the line between the points where the axis of rotation of that link and the axis of rotation of the next higher link intersect the plane of the end effector 600.

Next, if necessary, the end effector 600 is rotated by a predetermined angle about the rotation axis J5. This configuration may allow the laser tracker 800 to recognize the target 501 provided on the link 500. Specifically, the target 501 reflects the light emitted by the laser tracker 800, and the end effector 600 is rotated to a position where the reflected laser light may be recognized by the laser tracker 800. When the laser tracker 800 can recognize the target 501 without rotating the end effector 600, the end effector 600 may not be rotated. When the link 500 rotates from the link 400 about the rotation axis J4, the target 501 of the link 500 rotates. The target 501 rotates substantially in the illustrated XY plane. The laser tracker 800 measures the three-dimensional position of the target 501 by irradiating the target 501 with laser light and returning the laser light reflected from the target 501 to the laser tracker 800. The three-dimensional position of the target 501 is measured to obtain three-dimensional position coordinates of the target 501. The obtained three-dimensional position coordinates are stored in a memory (not shown). The eigendata is generated based on the three-dimensional position coordinates of the target 501 in the rotation state of the link 500 of the substrate transfer apparatus 1. The eigendata includes deviations in the X-axis, Y-axis, and Z-axis coordinates of the three-dimensional position coordinates at the time of rotation of the target 501. In addition, deviations between the designed theoretical values and the X-axis, Y-axis, and Z-axis coordinates of the three-dimensional position coordinates, which are actually measured values, are included. These deviations are calculated, generated as eigendata, and stored in the memory. The correction value at the time of operation of the link 500 is calculated based on the calculated deviations in the X-axis, Y-axis, and Z-axis coordinates. The eigendata includes correction values calculated based on deviations in the X-axis, Y-axis, and Z-axis coordinates in rotation.

Similarly, the link 500 is rotated by a predetermined angle about the rotation axis J4 as necessary. This configuration may allow the laser tracker 800 to recognize the target 401 provided on the link 400. Specifically, the target 401 reflects the light emitted by the laser tracker 800, and the link 500 is rotated to a position where reflected light may be recognized by the laser tracker 800. Here, when the laser tracker 800 can recognize the target 401 even if the link 500 does not rotate, the link 500 may not be rotated. When the link 400 rotates from the link 300 about the rotation axis J3, the target 401 of the link 400 rotates. The target 401 substantially rotates in the illustrated XY plane. The laser tracker 800 measures the three-dimensional position of the target 401 by irradiating the target 401 with laser light and returning the laser light reflected from the target 401 to the laser tracker 800. The three-dimensional position of the target 401 is measured to obtain three-dimensional position coordinates of the target 401. The obtained three-dimensional position coordinates are stored in a memory (not shown). The eigendata is generated based on the three-dimensional position coordinates of the target 401 in the rotation state of the link 400 of the substrate transfer apparatus 1. The eigendata includes deviations in the X-axis, Y-axis, and Z-axis coordinates of the three-dimensional position coordinates at the time of rotation of the target 401. In addition, deviations between the designed theoretical values and the X-axis, Y-axis, and Z-axis coordinates of the three-dimensional position coordinates, which are actually measured values, are included. These deviations are calculated, generated as eigendata, and stored in the memory. The correction value during the operation of the link 400 may be calculated based on the calculated deviations in the X-axis, Y-axis, and Z-axis coordinates. The eigendata may include a correction value calculated based on a deviation in X-axis, Y-axis, and Z-axis coordinates in rotation.

Similarly, the link 400 is rotated by a predetermined angle about the rotation axis J3 as necessary. This configuration may allow the laser tracker 800 to recognize the target 301 provided on the link 300. Specifically, the target 301 reflects the light emitted by the laser tracker 800, and the link 400 is rotated to a position where reflected light may be recognized by the laser tracker 800. Here, when the laser tracker 800 can recognize the target 301 even if the link 400 does not rotate, the link 400 may not be rotated. As the link 300 rotates from the elevator 200 about the rotation axis J2, the target 301 of the link 300 rotates. The target 301 rotates substantially in the illustrated XY plane. The laser tracker 800 measures the three-dimensional position of the target 301 by irradiating the target 301 with laser light and returning the laser light reflected from the target 301 to the laser tracker 800. The three-dimensional position of the target 301 is measured to obtain three-dimensional position coordinates of the target 301. The obtained three-dimensional position coordinates are stored in a memory (not shown). The eigendata is generated based on the three-dimensional position coordinates of the target 301 in the rotation state of the link 300 of the substrate transfer apparatus 1. The eigendata includes deviations in the X-axis, Y-axis, and Z-axis coordinates of the three-dimensional position coordinates at the time of rotation of the target 301. In addition, deviations between the designed theoretical values and the X-axis, Y-axis, and Z-axis coordinates of the three-dimensional position coordinates, which are actually measured values, are included. These deviations are calculated, generated as eigendata, and stored in the memory. The correction value at the time of operation of the link 300 at the time of extension may be calculated based on the calculated deviation in the X-axis, Y-axis, and Z-axis coordinates. The eigendata may include a correction value calculated based on a deviation in X-axis, Y-axis, and Z-axis coordinates in rotation.

In this specific example, the eigendata related to the elevator 200, the link 300, the link 400, the link 500, and the end effector 600 of the substrate transfer apparatus 1 is obtained using the target 301, the target 401, the target 501, and the target 601, but one or more embodiments is not limited thereto. For example, only the elevator 200 may be provided, or only the elevator 200 and the end effector 600 may be provided. In addition, in this specific example, the link 300 and the like are not moved when the parts such as the elevator 200 are operated. However, one or more embodiments is not limited thereto, and eigendata related to a combination of operations of the parts may be generated.

As described above, for example, at the time of quality test before shipment of the substrate transfer apparatus, calibration is performed by fixing the substrate transfer apparatus and operating each part. The result of the calibration is stored in a memory as unique information related to the operation of each part. The controller 700 may perform control so that the deviation included in the eigendata approaches a theoretical value in design. For example, the controller 700 may read a deviation between a design theoretical value and an actual measurement value, and control the operation of the substrate transfer apparatus based on the deviation.

Next, for example, the substrate transfer apparatus 1 is installed at an installation place such as a customer. At the time of installation, the installation is performed in the same environment as that at the time of fixing for the quality test described above. For example, the condition when the substrate transfer apparatus 1 is installed on the floor surface 10 at the time of quality test included in the eigendata is read. The conditions when the substrate transfer apparatus 1 is installed on the floor surface 10 in the quality test include the positions of the pins 101*a*, 101*b*, and 101*c*, the state of the floor surface 10, and the like. The substrate transfer apparatus 1 is installed under the same conditions as the conditions at the time of installation related to the read eigendata. Specifically, the pins 101*a*, 101*b*, and 101*c* are used to secure the fixing holes (not shown) of the base 100 used in the quality test. The eigendata may be displayed on a display (not shown) connected to the controller 700 as long as the eigendata may be reviewed at the time of installation.

The controller 700 performs calibration of the substrate transfer apparatus 1. During calibration, the controller 700 reads the eigendata and performs calibration based on the eigendata. Further, the controller 700 reads the eigendata, and operates the substrate transfer apparatus 1 based on a correction value calculated based on a deviation between a theoretical value in design and an actual measurement value. In this manner, the eigendata of the substrate transfer apparatus 1 is acquired, and installation and calibration are performed based on the eigendata at the time of actual installation. Further, the controller 700 controls the operation of the substrate transfer apparatus 1 based on a correction value calculated based on a deviation between a theoretical value in design of the substrate transfer apparatus 1 and an actual measurement value. Accordingly, the accuracy of the calibration process at the time of actual installation may be improved, the calibration process may be simplified, and the time may be shortened. Further, since the eigendata is held, a minimum reteaching is required at the installation location. Further, even when the substrate transfer apparatus is moved again, since the eigendata is held, a minimum reteaching is sufficient.

In the method for calibrating the substrate transfer apparatus 1 according to one or more embodiments, the elevator 200 is first measured, and then the end effector 600, the link 500, the link 400, and the link 300 are measured in this order. However, the order of measurement does not matter. An optical measuring instrument including a laser tracker 800 was used as measuring apparatus. However, one or more embodiments is not limited thereto, and other measuring instruments capable of two-dimensional or three-dimensional position measurement may be used. In addition, even when the substrate transfer apparatus 1 is installed in a place where the elevator 200, the links 300, 400, and 500, and the end effector 600 of the substrate transfer apparatus are limited in lifting and rotating operations at a delivery destination, the substrate transfer apparatus 1 may be calibrated within a movable range of the elevator 200, the links 300, 400, and 500, and the end effector 600.

Figure 9:
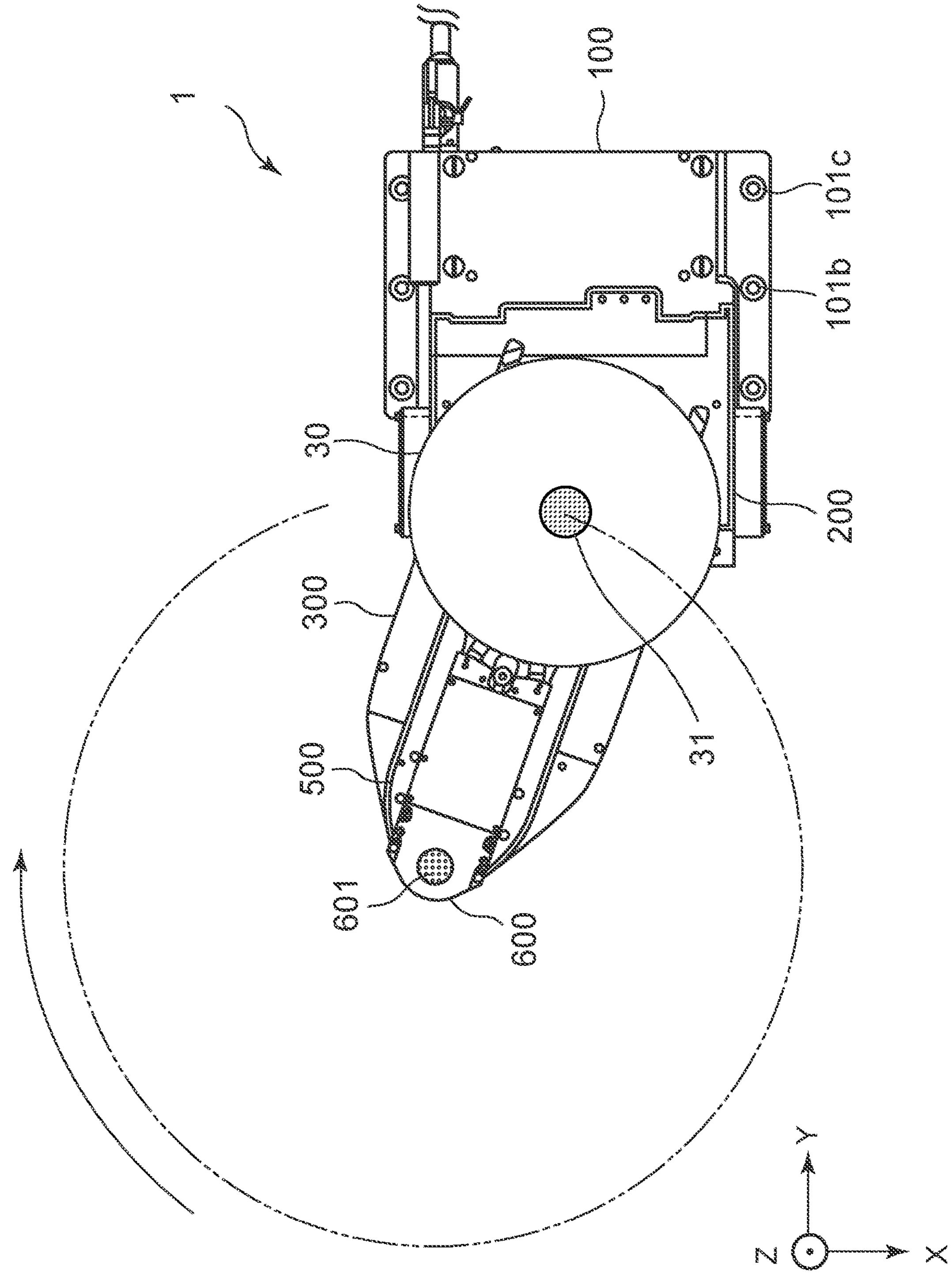
FIG. 9 is a diagram illustrating a top view of a state in which an end effector 600 of a substrate transfer apparatus 1 according to one or more examples is rotating.

FIG. 9 is a diagram illustrating a top view of a state in which the end effector 600 of the substrate transfer apparatus 1 according to one or more examples is rotating. In the substrate transfer apparatus shown in FIG. 9, the wafer jig 30 is gripped by the end effector 600. The wafer jig 30 includes a target 31 on a surface of the wafer jig 30. The target 31 may be placed substantially at center of the wafer jig 30. As the end effector 600 rotates from the link 500 about the rotation axis J5, the wafer jig 30 on the end effector 600 rotates. As a result, the target 31 on the wafer jig 30 substantially rotates on the XY plane shown in the drawing. The laser tracker 800 emits laser light, and the target 31 reflects the laser light. The laser light reflected from the target 31 is received by the laser tracker 800, and the three-dimensional position of the target 31 is measured. The three-dimensional position coordinates of the target 31 are obtained based on the three-dimensional position of the target 31. The obtained three-dimensional position coordinates are stored in a memory (not shown). The eigendata is generated based on the three-dimensional position coordinates of the target 31 in the rotation state of the end effector 600 of the substrate transfer apparatus 1. The eigendata includes the X-axis, Y-axis, and Z-axis coordinates of the three-dimensional position coordinates at the time of rotation of the target 31 in the stored state of the substrate transfer apparatus 1 and a deviation caused by this operation. In addition, deviations between the designed theoretical values and the X-axis, Y-axis, and Z-axis coordinates of the three-dimensional position coordinates, which are actually measured values, are included. These deviations are calculated, generated as eigendata, and stored in the memory. The correction values during operation of the end effector 600 may be calculated based on the calculated deviations in the X-axis, Y-axis, and Z-axis coordinates. The eigendata may include a correction value calculated based on a deviation in X-axis, Y-axis, and Z-axis coordinates in rotation.

Elevator 200, link 300, link 400, and link 500 may be stationary while the end effector 600 is rotating. Further, the center of the rotation circle may be calculated as a point at which a normal vector of the best-fit circle intersects a plane of the end effector 600, for example, a plane of the wafer jig 30 in the case of the substrate transfer apparatus 1. The rotation axis may be calculated as the unit normal vector of the best-fit circle. The length of each of the link 300, the link 400, and the link 500 may be calculated as a distance between points at which the rotation axis related to the connection portion between the link and the next upper link intersects the plane related to the end effector 600. If the substrate transfer apparatus 1 also has a linear degree of freedom, the optimal line direction for the collected data may be calculated. The kinematic model of the substrate transfer apparatus 1 may be calculated based on the length and the rotation axis direction of each link subjected to detect. The position of link zero may be detected by calculating the direction of the line between the points where the axis of rotation of the link and the axis of rotation of the next upper link intersect the plane of the end effector 600.

In the substrate transfer apparatus 1 shown in FIG. 9, the eigendata of the end effector is obtained by using the wafer jig 30 including the target 31. However, one or more embodiments is not limited to this configuration. For example, a target may be arranged on the end effector 600. In this case, the distance from the rotation axis J5 of the end effector 600 is preferably as far as possible. In addition, the target 31 is placed at the center of the wafer jig 30, but one or more embodiments is not limited thereto. Further, the wafer jig 30 has a target 31, but is not limited thereto, and may have a plurality of targets 31.

One or more embodiments have been described above. As the demand for operation accuracy of the substrate transfer apparatus increases, alignment at the time of installation becomes complicated. Further, as the demand for the operation accuracy of the substrate transfer apparatus increases, the individual difference of the substrate transfer apparatus may often become a problem. The positioning of the transfer apparatus of the substrate at the time of installation is particularly important because it is necessary to perform a determined operation with high reproducibility and accuracy. Therefore, it is often not sufficient to simply "instruct" the substrate transfer apparatus to the target position using a jig or sensor.

According to the substrate transfer apparatus and the calibration method of the substrate transfer apparatus according to one or more embodiments, the substrate transfer apparatus 1 is measured in advance, and the eigendata which is the data specific to the device is acquired and stored. Thereafter, installation and calibration are performed based on the eigendata stored at the time of actual installation. Further, the controller 700 controls the operation of the substrate transfer apparatus 1 based on a correction value calculated based on a deviation between a theoretical value in design of the substrate transfer apparatus 1 and an actual measurement value. Accordingly, the accuracy of the calibration process at the time of actual installation may be improved, the calibration process may be simplified, and the time may be shortened. Further, since the eigendata is stored, the minimum reteaching is required at the installation location. Further, even when the substrate transfer apparatus is moved again, since the eigendata is held, the minimum reteaching is sufficient.

One or more embodiments described herein above may be combined with each other as practicable within the scope of contemplated embodiments. The above-described embodiments are to be considered in all respects as illustrative and not restrictive. The examples shown and described may be extended to include other embodiments in addition to those specifically described without departing from the scope. The technical scope should be determined not only by the foregoing description but also in light of the specification including equivalents. Thus, all configurations including equivalents to the technical scope are intended to be included in the technical scope.

The invention claimed is:

1. A method of calibrating a substrate transfer apparatus comprising:

fixing the substrate transfer apparatus at a first location;

measuring an operation of the substrate transfer apparatus fixed at the first location;

generating eigendata relating to the operation of the substrate transfer apparatus fixed at the first location;

storing the eigendata relating to the operation of the substrate transfer apparatus fixed at the first location;

fixing the substrate transfer apparatus at a second location different from the first location; and performing, using the stored eigendata related to the operation of the substrate transfer apparatus fixed at the first location, calibration on the substrate transfer apparatus that is fixed at the second location.

2. The method of calibrating a substrate transfer apparatus according to claim 1, further comprising:

reading the stored eigendata relating to the operation of the substrate transfer apparatus fixed at the first location.

3. The method of calibrating a substrate transfer apparatus according to claim 1, further comprising generating eigendata relating to fixing of the substrate transfer apparatus at the first location; and storing the eigendata relating to the fixing of the substrate transfer apparatus at the first location.

4. The method of calibrating a substrate transfer apparatus according to claim 3, further comprising:

reading the stored eigendata relating to the fixing of the substrate transfer apparatus at the first location; and fixing the substrate transfer apparatus at the second location, based on eigendata related to the fixing of the substrate transfer apparatus at the first location.

5. The method of calibrating a substrate transfer apparatus according to claim 4, wherein the eigendata related to the fixing of the substrate transfer apparatus at the first location includes data related to a position of a pin used when fixing the substrate transfer apparatus at the first location.

6. The method of calibrating a substrate transfer apparatus according to claim 1, wherein the substrate transfer apparatus comprises:

an elevator; and an end effector comprising a first target that reflects light, the end effector is lifted and lowered with lifting and lowering of the elevator, wherein the eigendata related to the operation of the substrate transfer apparatus fixed at the first location comprises data related to three-dimensional position coordinates of the first target measured by the lifted and lowered of the end effector.

7. The method of calibrating a substrate transfer apparatus according to claim 1, wherein the substrate transfer apparatus comprises:

a link; and an end effector comprising a target that reflects light, the end effector is rotated with rotation of the link, wherein the eigendata related to the operation of the fixed substrate transfer apparatus fixed at the first location comprises data related to three-dimensional position coordinates of the target measured by the rotation of the end effector.

8. The method of calibrating a substrate transfer apparatus according to claim 1, wherein the substrate transfer apparatus comprises:

a link comprising a target reflecting light; and an end effector that rotates with rotation of the link, wherein the eigendata related to the operation of the substrate transfer apparatus fixed at the first location comprises data related to three-dimensional position coordinates of the target measured by the rotation of the link.

9. The method of calibrating a substrate transfer apparatus according to claim 1, wherein reading the stored eigendata relating to the operation of the substrate transfer apparatus, the eigendata relating to the operation of the substrate transfer apparatus fixed at the first location comprises a correction value calculated based on the measured operation of the substrate transfer apparatus fixed at the first location, and the substrate transfer apparatus operates at the second location based on the correction value.

10. The method of calibrating a substrate transfer apparatus, according to claim 9, wherein the correction value is calculated based on an actual measurement value of the measured operation of the substrate transfer apparatus fixed at the first location and a theoretical value in design of the substrate transfer apparatus.

11. The method of calibrating a substrate transfer apparatus according to claim 1, wherein the first location comprises a location at which a quality test of the substrate transfer apparatus is performed before shipment of the substrate transfer apparatus to an installation location; and the second location comprises the installation location at which the substrate transfer apparatus is installed.

12. A substrate transfer apparatus comprises:

a base;

an elevator connected to the base, which extends and retracts; and an end effector comprising a target that reflects light and a memory, and is lifted and lowered with extension and retraction of the elevator, wherein the memory stores eigendata related to fixing of the substrate transfer apparatus at a first location at a time of testing and eigendata related to an operation of the substrate transfer apparatus fixed at the first location, wherein at least one of the eigendata related to the fixing of the substrate transfer apparatus at the first location and the eigendata related to the operation of the substrate transfer apparatus fixed at the first location are configured to perform calibration on the substrate transfer apparatus at a second location.

13. The substrate transfer apparatus according to claim 12, wherein:

the eigendata related to the fixing of the substrate transfer apparatus includes data related to a position of a pin used when the substrate transfer apparatus is fixed at the first location.

14. The substrate transfer apparatus according to claim 13, wherein:

the eigendata related to the operation of the substrate transfer apparatus fixed at the first location comprises data related to three-dimensional position coordinates of a target provided at the substrate transfer apparatus and measured during the operation of the substrate transfer apparatus fixed at the first location.

15. The substrate transfer apparatus according to claim 12, wherein the first location comprises a location at which a quality test of the substrate transfer apparatus is performed before shipment of the substrate transfer apparatus to an installation location; and the second location comprises the installation location at which the substrate transfer apparatus is installed.

* * * * *